(12) United States Patent
Kuroda et al.

(10) Patent No.: US 10,738,728 B2
(45) Date of Patent: Aug. 11, 2020

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventors: Ryusuke Kuroda, Nagoya (JP); Masahiro Ozeki, Nagoya (JP); Masanao Idogawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/514,013

(22) Filed: Jul. 17, 2019

(65) Prior Publication Data

US 2020/0049097 A1    Feb. 13, 2020

(30) Foreign Application Priority Data

Aug. 9, 2018 (JP) .................................. 2018-150353

(51) Int. Cl.
*F02D 41/34* (2006.01)
*F02D 41/02* (2006.01)
*F02D 13/02* (2006.01)
*F02D 41/00* (2006.01)

(52) U.S. Cl.
CPC ......... *F02D 41/345* (2013.01); *F02D 13/023* (2013.01); *F02D 13/0207* (2013.01); *F02D 41/0255* (2013.01); *F02D 2041/001* (2013.01)

(58) Field of Classification Search
CPC ............... F02D 41/345; F02D 41/0255; F02D 13/0207; F02D 13/023; F02D 2041/001; F02D 41/0025; F02D 2041/286; F02D 2200/0611; F02D 19/087; F02D 19/084
See application file for complete search history.

(56) References Cited

U.S. PATENT DOCUMENTS

2011/0264357 A1*  10/2011  Sasai ..................... F02D 41/008
                                                                701/104

FOREIGN PATENT DOCUMENTS

| JP | 2010-133288 A | 6/2010 |
| JP | 2010-196595 A | 9/2010 |
| JP | 2011-001856 A | 1/2011 |
| JP | 2011-111916 A | 6/2011 |
| JP | 2011-231666 A | 11/2011 |

* cited by examiner

*Primary Examiner* — Xiao En Mo
(74) *Attorney, Agent, or Firm* — Oliff PLC (57) ABSTRACT

A controller for an internal combustion engine includes processing circuitry. The processing circuitry is configured to execute an estimation process that estimates a density parameter of fuel in an upper layer portion of a delivery pipe and a density parameter of fuel in a lower layer portion of the delivery pipe and an operation process that includes acquiring a density parameter of the fuel injected from a fuel injection valve and operating an operation unit of the internal combustion engine based on the acquired density parameter. The estimation process includes a process that assumes that when the density of the fuel flowing into the delivery pipe is high, a greater proportion of the fuel flowing into the delivery pipe flows into the lower layer portion than when the density of the fuel flowing into the delivery pipe is low.

6 Claims, 4 Drawing Sheets

1. Field

The following description relates to a controller for an internal combustion engine and a method for controlling an internal combustion engine.

2. Description of Related Art

For example, Japanese Laid-Open Patent Publication No. 2011-1856 describes a controller for an internal combustion engine. An alcohol concentration sensor detects an alcohol concentration of fuel that is supplied to a fuel injection valve. The alcohol concentration of the fuel injected from the fuel injection valve is referred to as the control alcohol concentration. The controller calculates the control alcohol concentration based on the alcohol concentration of fuel detected by the alcohol concentration sensor. After fuel is added to a fuel tank, if a change in a detection value of the alcohol concentration is detected, the controller increases an update amount, which is used to update the calculated value of the control alcohol concentration, in accordance with a correction amount of an injection amount determined by air-fuel ratio feedback control.

More specifically, an error in the calculated value of the control alcohol concentration is detected through the air-fuel ratio feedback control. When it is detected that there is an error in the calculated value of the control alcohol concentration, the calculated value of the control alcohol concentration is updated. Thus, the calculated value of the control alcohol concentration may not be a proper value until an actual error is detected through the control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Multiple aspects of the present disclosure and the effects will be described below.

Aspect 1. An aspect of the present disclosure provides a controller for an internal combustion engine. The internal combustion engine is mounted on a vehicle and includes a fuel injection valve configured to inject fuel so that the fuel is supplied to a combustion chamber of the internal combustion engine, a delivery pipe configured to supply fuel to the fuel injection valve, and a sensor provided at an upstream side of the delivery pipe and configured to detect a physical quantity correlated with a density of the fuel. The delivery pipe includes a supply area and is configured to supply the fuel from the supply area to the fuel injection valve. When a posture of the vehicle is horizontal, the supply area is located at a position biased toward one of an upper side or a lower side of the delivery pipe in a vertical direction. The controller includes processing circuitry. The processing circuitry is configured to execute an estimation process that estimates a density parameter of fuel in an upper layer portion of the delivery pipe and a density parameter of fuel in a lower layer portion of the delivery pipe in the vertical direction based on a detection value of the sensor, and an operation process that includes acquiring a density parameter of the fuel injected from the fuel injection valve based on at least one of the estimated density parameter of the fuel in the upper layer portion or the estimated density parameter of the fuel in the lower layer portion and operating an operation unit of the internal combustion engine based on the acquired density parameter. The density parameter of one of the upper layer portion or the lower layer portion located closer to the supply area has a higher degree of contribution to the density parameter of the fuel injected from the fuel injection valve. The estimation process includes a process that assumes that when the density of the fuel flowing into the delivery pipe is high, a greater proportion of the fuel flowing into the delivery pipe flows into the lower layer portion than when the density of the fuel flowing into the delivery pipe is low.

When the density of fuel flowing into the delivery pipe changes, the density of fuel flowing into the delivery pipe may or may not be greater than the density of the fuel already present in the delivery pipe. Accordingly, the fuel flowing into the delivery pipe is biased toward one of the upper layer portion or the lower layer portion of the delivery pipe. In the configuration described above, it is assumed that when the density of the fuel flowing into the delivery pipe is high, a greater proportion of the fuel flowing into the delivery pipe flows into the lower layer portion than when the density is low. Additionally, in the configuration described above, the density parameter of the fuel in the upper layer portion and the density parameter of the fuel in the lower layer portion are estimated. Then, the density parameter of the fuel injected from the fuel injection valve corresponding to the estimated density parameters is acquired depending on whether the supply area of the fuel to the fuel infection valve is located closer to the upper layer portion or the lower layer portion. Thus, before the fuel injection valve injects fuel, the density parameter of the fuel that is to be injected is accurately estimated. Ultimately, the operation unit can be operated in accordance with the density parameter.

Aspect 2. In the controller according to aspect 1, the supply area may be located in the lower layer portion, and the operation process may include a process that operates the operation unit based on the density parameter of the fuel in the lower layer portion.

In the configuration described above, the supply area is located toward the lower layer portion in the delivery pipe. In the configuration described above, the operation unit is operated based on the density parameter of the fuel in the lower layer portion. This allows the operation unit to be operated while acknowledging the properties and state of the fuel injected from the fuel injection valve with high accuracy.

Aspect 3. In the controller according to aspect 2, the estimation process may include a flowing amount calculation process, a division process, an upper layer portion update process, and a lower layer portion update process. The flowing amount calculation process calculates a flowing amount of fuel flowing into the delivery pipe based on a fuel injection amount of the fuel injection valve. The division process calculates a flowing amount of fuel flowing into the lower layer portion and a flowing amount of fuel flowing into the upper layer portion from the flowing amount calculated by the flowing amount calculation process based on the detection value of the sensor. The upper layer portion update process updates the density parameter of the fuel in the upper layer portion based on an average value of a preceding value of the density parameter of the fuel in the upper layer portion and a density parameter of the fuel flowing into the delivery pipe. The upper layer portion update process assigns the preceding value of the density parameter of the fuel in the upper layer portion to a value obtained by subtracting the flowing amount of the fuel flowing into the upper layer portion from a volume of the upper layer portion and assigns the density parameter of the fuel flowing, into the delivery pipe to the flowing amount of the fuel flowing into the upper layer portion. The lower layer portion update process updates the density parameter of the fuel in the lower layer portion based on an average value of a preceding value of the density parameter of the fuel in the lower layer portion, the preceding value of the density parameter of the fuel in the upper layer portion, and the density parameter of the fuel flowing into the delivery pipe. The lower layer portion update process assigns the preceding value of the density parameter of the fuel in the lower layer portion to a value obtained, by subtracting the flowing amount calculated by the flowing amount calculation process from a volume of the lower layer portion, assigns the preceding value of the density parameter of the fuel in the upper layer portion to the flowing amount of the fuel flowing into the upper layer portion, and assigns the density parameter of the fuel flowing into the delivery pipe to the flowing amount of the fuel flowing into the lower layer portion.

In the configuration described above, the division process calculates the flowing amount of the fuel flowing into the upper layer portion and the flowing amount of the fuel flowing into the lower layer portion from the flowing amount of the fuel flowing into the delivery pipe based on the detection value of the sensor. Thus, when the density of the fuel flowing into the delivery pipe is high, the flowing amount of the fuel flowing into the lower layer portion is increased as compared to when the density is low. The density parameter of the fuel in the upper layer portion is updated such that the density parameter of fuel corresponding to an amount of fuel flowing into the upper layer portion is replaced with the density parameter of the fuel flowing into the delivery pipe. In other words, the density parameter of the fuel in the upper layer portion is updated based on partial replacement of the fuel in the upper layer portion with the fuel flowing into the upper layer portion. The fuel flowing into the upper layer portion has the same density parameter as the fuel flowing into the delivery pipe. Thus, the density parameter of the fuel in the upper layer portion is accurately estimated. Additionally, the density parameter of the fuel in the lower layer portion is updated such that the density parameter changes corresponding to the amount of fuel flowing into the lower layer portion from the delivery pipe and the amount of fuel flowing into the lower layer portion from the upper layer portion. In other words, the density parameter of the fuel in the lower layer portion is updated based on a partial replacement of the fuel in the lower layer portion with the fuel flowing into the lower layer portion. The fuel flowing into the lower layer portion may include fuel having the same density parameter as the fuel flowing into the delivery pipe or may include fuel flowing into the lower layer portion from the upper layer portion. Thus, the density parameter of the fuel in the lower layer portion is accurately estimated.

Aspect 4. In the controller according to any one of aspects 1 to 3, the processing circuitry may be configured to constantly execute the estimation process regardless of whether fuel is added to a fuel tank configured to store the fuel to be supplied to the delivery pipe, and the operation process may include a process that operates the operation unit based on at least one of the estimated density parameter of the fuel in the upper layer portion or the estimated density parameter of the fuel in the lower layer portion regardless of whether the fuel is added to the fuel tank.

In the configuration described above, the operation unit is operated based on the density parameter estimated by the estimation process regardless of whether fuel is added to the fuel tank. Thus, even when fuel in the fuel tank having different densities is separated with time and the density of the fuel flowing into the delivery pipe is changed, the operation unit is operated based on the density parameter with high accuracy as compared to a configuration that uses the detection value of the sensor without using the estimation process.

Aspect 5. In the controller according to any one of aspects 1 to 4, the sensor may be an alcohol concentration sensor configured to detect alcohol concentration, and the density parameter may be alcohol concentration Aspect 6. An aspect of the present disclosure provides a method for controlling an internal combustion engine. The internal combustion engine is mounted on a vehicle and includes a fuel injection valve configured to inject fuel so that the fuel is supplied to a combustion chamber of the internal combustion engine, a delivery pipe configured to supply fuel to the fuel injection valve, and a sensor provided at an upstream side of the delivery pipe and configured to detect a physical quantity correlated with a density of the fuel. The delivery pipe includes a supply area and is configured to supply the fuel from the supply area to the fuel injection valve. When a posture of the vehicle is horizontal, the supply area is located at a position biased toward one of an upper side or a lower side of the delivery pipe in a vertical direction. The method includes executing an estimation process that estimates a density parameter of fuel in an upper layer portion of the delivery pipe and a density parameter of fuel in a lower layer portion of the delivery pipe in the vertical direction based on a detection value of the sensor, and executing an operation process that includes acquiring a density parameter of the fuel injected from the fuel injection valve based on at least one of the estimated density parameter of the fuel in the upper layer portion or the estimated density parameter of the fuel in the lower layer portion and operating an operation unit of the internal combustion engine based on the acquired density parameter. The density parameter of one of the upper layer portion or the lower layer portion located closer to the supply area has a higher degree of contribution to the density parameter of the fuel injected from the fuel injection valve. The estimation process includes a process that assumes that when the density of the fuel flowing into the delivery pipe is high, a greater proportion of the fuel flowing into the delivery pipe flows into the lower layer portion than when the density of the fuel flowing into the delivery pipe is low.

Other features and aspects will he apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to of ordinary skill in the art.

An embodiment of a controller for an internal combustion engine will now be described with reference to the drawings.

Figure 1:
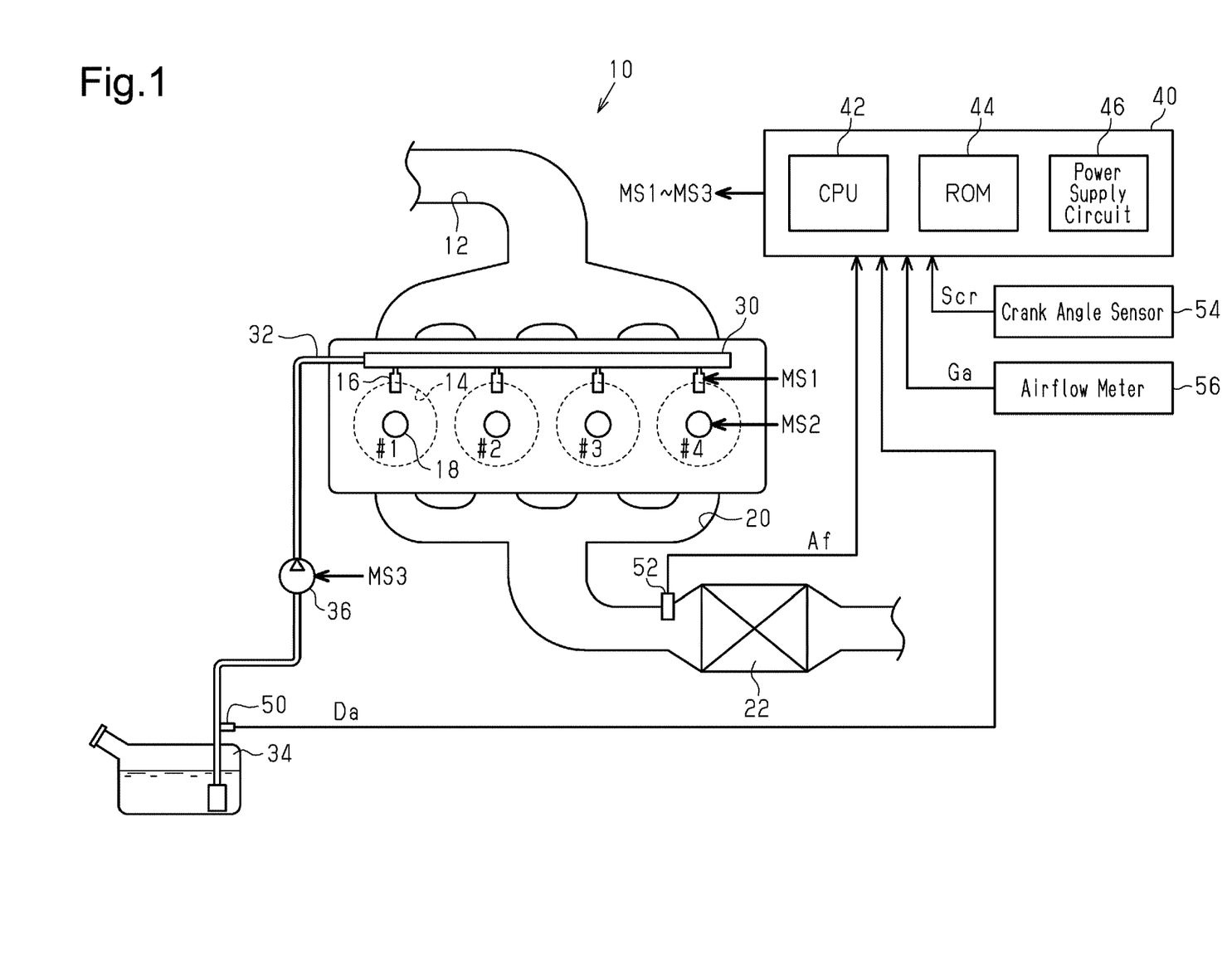
FIG. 1 is a diagram showing an embodiment of an internal combustion engine and a controller for the internal combustion engine.

An internal combustion engine 10 shown in FIG. 1 is mounted on a vehicle. Air drawn in from an intake passage 12 of the internal combustion engine 10 flows into a combustion chamber 14. An air-fuel mixture of the air flowing into the combustion chamber 14 and the fuel injected from a fuel injection valve 16 is burned by a spark discharge of an ignition device 18. The burnt air-fuel mixture is discharged to an exhaust passage 20 as exhaust gas. A catalyst 22 is provided in the exhaust passage 20.

The fuel injection valve 16 is connected to a vertically lower portion of the delivery pipe 30 when the posture of the vehicle is horizontal, and is supplied with fuel from the delivery pipe 30. The posture of the vehicle is horizontal when the vehicle is located on a flat road surface with no slope. The fuel stored in a fuel tank 34 is pumped by a fuel pump 36 and supplied to the delivery pipe 30 through a fuel passage 32. In the present embodiment, the fuel stored in the fuel tank 34 includes at least one of gasoline or alcohol.

The controller 40 is configured to control the internal combustion engine 10 and operates operation units of the internal combustion engine 10 such as the fuel injection valve 16, the ignition device 18, and the fuel pump 36 in order to control engine aspects such as torque and an exhaust component ratio. At this time, the controller 40 references art alcohol concentration Da in the fuel passage 32 detected by a alcohol concentration sensor 50, an air-fuel ratio Af detected by an air-fuel ratio sensor 52, an output signal Scr of a crank angle sensor 54, and an intake air amount Ga detected by an airflow meter 56. The controller 40 includes a CPU 42, a ROM 44, and a power supply circuit 46 that supplies power to each component of the controller 40. When the CPU 42 executes programs stored in the ROM 44, the engine aspects described above are controlled.

Figure 2:
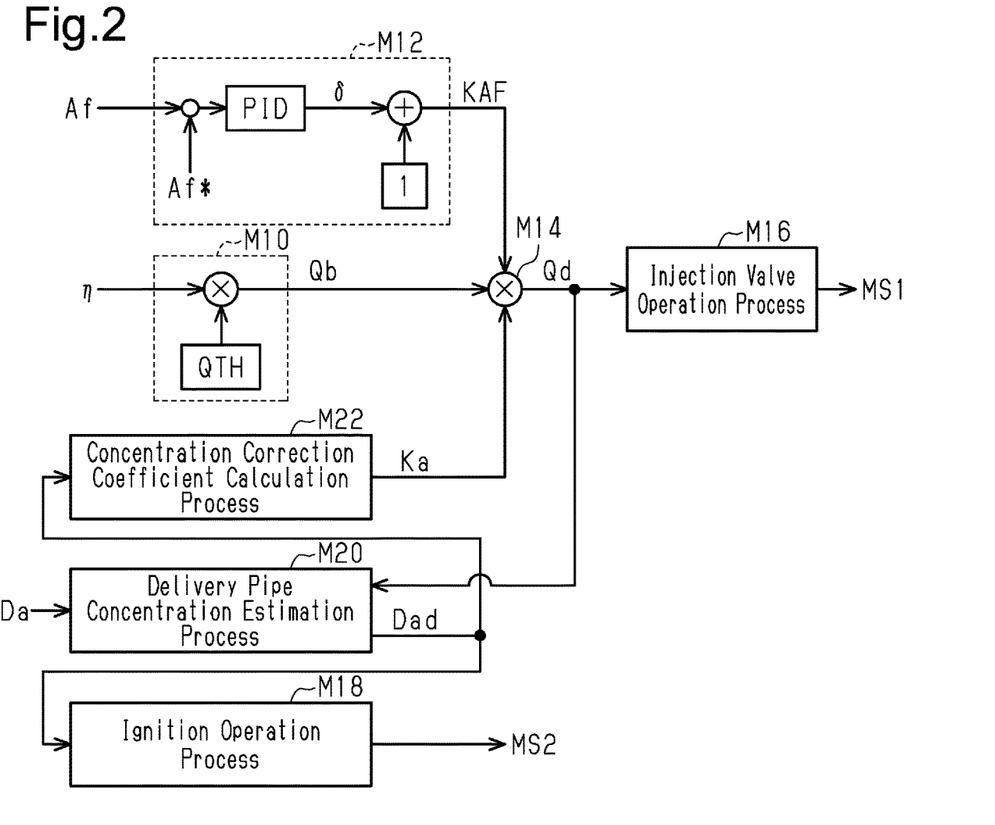
FIG. 2 is a block diagram showing a process performed by the controller shown in FIG. 1.

FIG. 2 shows some of the processes implemented by the CPU 42 executing the programs stored in the ROM 44.

A base injection amount calculation process M10 is a process that calculates a base injection amount Qb, which is a base value of the fuel amount for setting the air-fuel ratio of the air-fuel mixture in the combustion chamber 14 to a target air-fuel ratio, based on a charging efficiency $\eta$. More specifically, for example, when the charging efficiency $\eta$ is expressed as a percentage, the base injection amount calculation process M10 may calculate the base injection amount Qb by multiplying the charging efficiency $\eta$ and a fuel amount QTH per 1% of the charging efficiency $\eta$ for setting the air-fuel ratio to the target air-fuel ratio. The base injection amount Qb is a fuel amount calculated to control the air-fuel ratio to the target air-fuel ratio based on the amount of air filled in the combustion chamber 14. The target air-fuel ratio may be, for example, a stoichiometric air-fuel ratio. In the present embodiment, the fuel amount QTH is set to a value related to a fuel having an alcohol concentration of 0%, or gasoline.

The correction rate $\delta$ of the base injection amount Qb is an operation amount used when performing feedback control so that an air-fuel ratio Af is set to a target value Af*. A feedback process M12 is a process that calculates and outputs a feedback correction coefficient KAF by adding one to the correction rate $\delta$. More specifically, the feedback process M12 calculates the correction rate $\delta$ based on the sum of an output value of a proportional element into which a difference between the air-fuel ratio Af and the target value Af* is input, an output value of a derivative element into which the difference is input, and an output value of an integration element that holds and outputs an integrated value of values corresponding to the difference.

A requested injection amount calculation process M14 is a process that calculates a requested injection amount Qd by multiplying the base injection amount Qb by the feedback correction coefficient KAF and a concentration correction coefficient Ka.

An injection valve operation process M16 is a process that operates the fuel injection valve 16 by sending an operation signal MS1 to the fuel injection valve 16 so that the fuel injection valve 16 injects fuel corresponding to the requested injection amount Qd.

A delivery pipe concentration estimation process M20 is a process that estimates the alcohol concentration in the delivery pipe 30.

A concentration correction coefficient calculation process M22 is a process that calculates a concentration correction coefficient Ka for correcting the base injection amount Qb based on a lower layer portion concentration Dad estimated by the delivery pipe concentration estimation process M20. More specifically, the concentration correction coefficient calculation process M22 calculates the concentration correction coefficient Ka to be a greater value when the lower layer portion concentration Dad is high than when the lower layer portion concentration Dad is low. When the lower layer portion concentration Dad is zero, the concentration correction coefficient Ka is calculated to be one. This is in view of the stoichiometric air-fuel ratio having a smaller value when the fuel has a high alcohol concentration than when the fuel has a low alcohol concentration.

An ignition operation process M18 is a process that variably sets the ignition timing based on the lower layer portion concentration Dad and sends an operation signal MS2 to the ignition device 18 so that the ignition device 18 is operated in accordance with the set ignition timing. This is in view of the combustion speed of the air-fuel mixture varying in accordance with the alcohol concentration of the fuel supplied to the combustion chamber 14.

The delivery pipe concentration estimation process M20 will now be described in detail.

Figure 3:
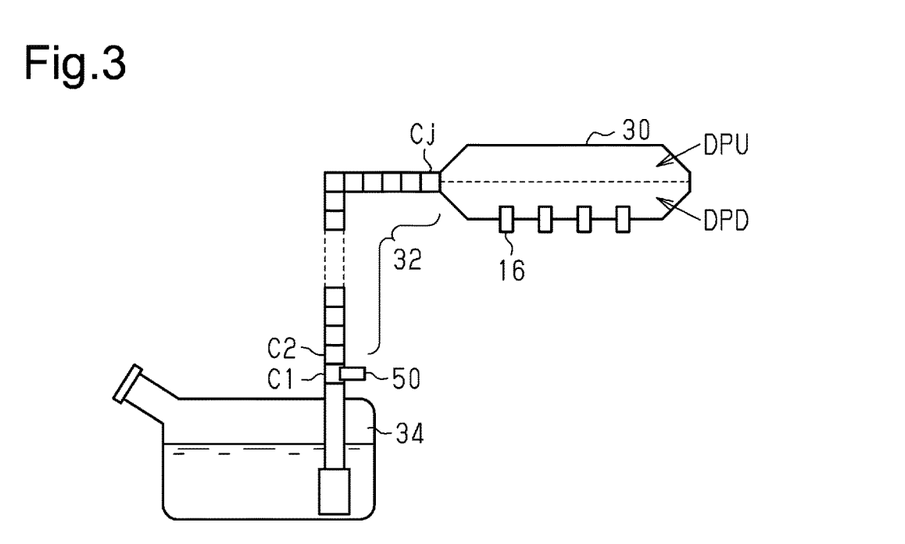
FIG. 3 is a diagram illustrating a process of estimating an alcohol concentration executed by the controller shown in FIG. 1.

As shown in FIG. 3, in the present embodiment, the CPU 42 divides the filet passage 32 into multiple cells C1, C2, . . . , Cj from a portion where the alcohol concentration sensor 50 is arranged to a downstream side of the portion. The CPU 42 then calculates cell concentrations Cda1, Cda2, . . . Cdaj, which are alcohol concentrations of the fuel in the cells C1, C2, . . . Cj. The CPU 42 also divides the delivery pipe 30 into an upper layer portion DPU and a lower layer portion DPD. When the posture of the vehicle is horizontal, the upper layer portion DPU is located at an upper side in the vertical direction, and the lower layer portion DPD is located at a lower side in the vertical direction. The CPU 42 estimates an upper layer portion concentration Dau, which is the alcohol concentration of the fuel in the upper layer portion DPU, and the lower layer portion concentration Dad, which is the alcohol concentration of the fuel in the lower layer portion DPD, in the fuel in the delivery pipe 30. In the present embodiment, the fuel passage 32 is connected to a central portion of the delivery pipe 30 between the upper side and the lower side in the vertical direction when the posture of the vehicle is horizontal. In other words, the position of the fuel passage 32 in the vertical direction is the same as the position of the boundary plane between the upper layer portion DPU and the lower layer portion DPD in the vertical direction.

Figure 4:
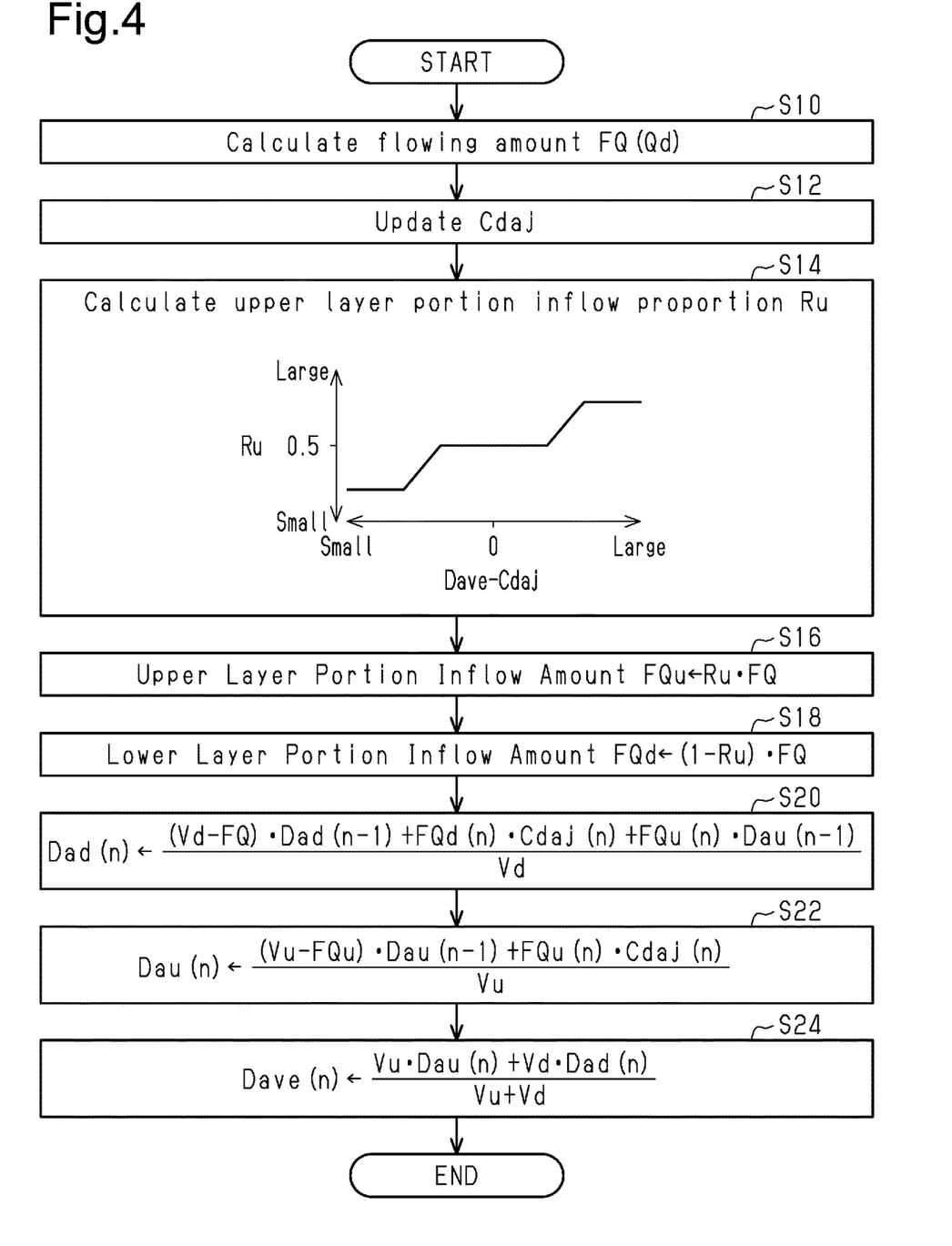
FIG. 4 is a flowchart showing the procedure of a delivery pipe concentration estimation process executed by the controller shown in FIG. 1.

FIG. 4 shows the procedure of the delivery pipe concentration estimation process M20. The processes shown in FIG. 4 are implemented by the CPU 42 repeatedly executing the programs stored in the ROM 44 in, for example, a predetermined cycle.

In the series of processes shown in FIG. 4, the CPU 42 calculates the flowing amount FQ of the fuel flowing into the delivery pipe 30 based on the requested injection amount Qd (S10). Because the amount of fuel injected from the fuel injection valve 16 is the same as the amount of fuel flowing into the delivery pipe 30 from the fuel passage 32, the CPU 42 calculates the flowing amount FQ based on the amount of fuel injected from the fuel injection valve 16 per unit time. The CPU 42 updates a cell concentration Cdaj based on the flowing amount FQ (S12). The cell concentration Cdaj is the alcohol concentration of a cell Cj, which is the one of the cells C1, C2, . . . Cj that is adjacent to the delivery pipe 30. The update of the cell concentration Cdaj will now be described in detail. The CPU 42 is configured to acquire an integrated value of the flowing amount FQ. Each of the cells C1, C2, . . . Cj has a volume CV. The volume CV times j is denoted by "CV·j." The CPU 42 sets the cell concentration Cdaj to the alcohol concentration Da detected by the alcohol concentration sensor 50 at the point in time when the integrated value of the flowing amount FQ is equal to a value obtained by subtracting "CV·j" from the present integrated value of the flowing amount FQ. This process ignores a phenomenon in which changes in the alcohol concentration of the fuel in the fuel tank 34 generate diffusion in the fuel passage 32 and fuels having different alcohol concentrations are mixed with each other. The cross-sectional area of the flow path in the fuel passage 32 is sufficiently small so that the accuracy of estimating the cell concentration Cdaj will not be decreased to an unacceptable level even when the diffusion phenomenon is ignored.

When the amount of fuel flowing into the delivery pipe 30 from the fuel passage 32 is the flowing amount FQ calculated in S10, the CPU 42 calculates the proportion (upper layer portion inflow proportion Ru) of the amount of fuel flowing into the upper layer portion DPU in relation to the amount of fuel flowing into the delivery pipe 30 (S14). When the cell concentration Cdaj, that is, the alcohol concentration of the fuel flowing into the delivery pipe 30, is low, the density of the fuel is less than when the cell concentration Cdaj is high. Thus, when the cell concentration Cdaj is low, the CPU 42 calculates the upper layer portion inflow proportion Ru to a greater value than when the cell concentration Cdaj is high. More specifically, when a value obtained by subtracting the cell concentration Cdaj from an average value Dave of the alcohol concentration in the delivery pipe 30, which will be described later, is large, the CPU 42 calculates the upper layer portion inflow proportion Ru to a greater value than when the obtained value is small. When the value obtained by subtracting the cell concentration Cdaj from the average value Dave is close to zero, the CPU 42 sets the upper layer portion inflow proportion Ru to 0.5. When the value obtained by subtracting the cell concentration Cdaj from the average value Dave is greater than or equal to a predetermined value, the CPU 42 sets the upper layer portion inflow proportion Ru to a constant value regardless of the value obtained by subtracting the cell concentration Cdaj from the average value Dave. Also, when the value obtained by subtracting the cell concentration Cdaj from the average value Dave is less than or equal to a specified value, the CPU 42 sets the upper layer portion inflow proportion Ru to a constant value regardless of the value obtained by subtracting the cell concentration Cdaj from the average value Dave.

More specifically the ROM 44 stores, in advance, map data in which the value obtained by subtracting the cell concentration Cdaj from the average value Dave is an input variable and the upper layer portion inflow proportion Ru is an output variable. The CPU 42 calculates the upper layer portion inflow proportion Ru through map calculation. The map data is set data of discrete values of input variables and values of output variables corresponding to the values of the respective input variables. In the map calculation, for example, when the value of the input variable matches any of the values of the input variables in map data, the value of the corresponding output variable in the map data may be output as the calculation result. When the value of the input variable does not match any of the values of the input variables in the map data, a value obtained by interpolating the values of output variables included in the map data may be output as the calculation result.

The CPU 42 multiplies the flowing amount FQ and the upper layer portion inflow proportion Ru to calculate the upper layer portion inflow amount FQu, which is the amount of fuel flowing from the fuel passage 32 into the upper layer portion DPU of the delivery pipe 30 (S16). Additionally, the CPU 42 multiplies "1−Ru" and the flowing amount FQ to calculate a lower layer portion inflow amount FQd, which is the amount of fuel flowing from the fuel passage 32 into the lower layer portion DPD of the delivery pipe 30 (S18).

The CPU 42 calculates the lower layer portion concentration Dad, which is the alcohol concentration of the fuel in the lower layer portion DPD (520). The variable n shown in FIG. 4 specifies the sampling timing. Each of the variables with "n" is the latest sampling value in the present control cycle of the series of processes shown in FIG. 4. Each of the variables with "n−1" is the latest sampling value in the preceding control cycle of the series of processes shown in FIG. 4.

The CPU 42 calculates the lower layer portion concentration Dad(n) such that the value obtained by multiplying the volume Vd of the lower layer portion DPD and the lower layer portion concentration Dad(n) conforms to the following expression (c1).

$$(Vd-FQ) \cdot Dad(n-1) + FQd(n) \cdot Cdaj(n) + FQu(n) \cdot Dau(n-1) \quad \text{(c1)}$$

The amount of fuel discharged from the lower layer portion DPD through the fuel injection valve 16 is equal to the flowing amount FQ. Thus, of the fuel that is present in the lower layer portion DPD, the amount of fuel having a concentration equal to the lower layer portion concentration Dad(n−1), which is the preceding sampling value, is "Vd−FQ," which is obtained by subtracting the flowing amount FQ from the volume Vd of the lower layer portion DPD. Also, the lower layer portion inflow amount FQd(n) of fuel having a concentration equal to the cell concentration Cdaj(n) flows into the lower layer portion DPD from the fuel passage 32. The flowing amount FQ of fuel discharges from the lower layer portion DPD through the fuel injection valve 16. The amount of fuel discharged from the lower layer portion DPD is equal to the amount of fuel flowing into the lower layer portion DPD. Therefore, the fuel of the flowing amount FQ flows into the lower layer portion DPD. The sum of the upper layer portion inflow amount FQu(n) calculated in the process of S16 and the lower layer portion inflow amount FQd(n) calculated in the process of S18 conforms to the flowing amount FQ calculated in the process of S10. Thus, it is considered that the upper layer portion inflow amount FQu of fuel flows into the lower layer portion DPD from the upper layer portion DPU. Therefore, fuel having the upper layer portion concentration Dau(n−1), which is the preceding sampling value, flows into the lower layer portion DPD from the upper layer portion DPU. The inflow amount of the fuel is the upper layer portion inflow amount FQu(n). Accordingly, when, the fuel corresponding to the flowing amount FQ is discharged from the lower layer portion DPD through the fuel injection valve 16, the lower layer portion concentration Dad(n), which is the alcohol concentration of the fuel in the lower layer portion DPD, has a value obtained by dividing the value of the above expression (c1) by the volume Vd of the lower layer portion DPD. In other words, the lower layer portion concentration Dad(n) has a value obtained by weighting and averaging the preceding value Dad(n−1) of the lower layer portion concentration, the preceding value Dau(n−1) of the upper layer portion concentration, and the cell concentration Cdaj(n). More specifically, the preceding value Dad(n−1) of the lower layer portion concentration is weighted by "Vd−FQ" obtained by subtracting the flowing amount FQ from the volume Vd of the lower layer portion DPD. The preceding value Dau(n−1) of the upper layer portion concentration is weighted by the upper layer portion inflow amount FQu(n). The cell concentration Cdaj(n) is weighted by the lower layer portion inflow amount FQd(n).

The CPU 42 calculates the upper layer portion concentration Dau, which is the alcohol concentration of the fuel in the upper layer portion DPU (S22). The CPU 42 calculates the upper layer portion concentration Dau(n) such that a value obtained by multiplying the volume Vu of the upper layer portion DPU and the upper layer portion concentration Dau(n) conforms to the following expression (c2).

$$(Vu-FQu) \cdot Dau(n-1) + FQu(n) \cdot Cdaj(n) \quad \text{(c2)}$$

As described above, the amount of fuel flowing from the upper layer portion DPU to the lower layer portion DPD is equal to the upper layer portion inflow amount FQu(n). Thus, the amount of fuel having the preceding upper layer portion concentration Dau(n−1) is "Vu−FQ," which is obtained by subtracting the upper layer portion inflow amount FQu(n) from the volume Vu of the upper layer portion DPU. The upper layer portion inflow amount FQu(n) of fuel flows into the upper layer portion DPU from the fuel passage 32, and the alcohol concentration of the fuel is equal to the cell concentration Cdaj(n). Therefore, when the flowing amount FQ of fuel is discharged from the lower layer portion DPD through the fuel injection valve 16, the upper layer portion concentration Dau(n) equals a value obtained by dividing the above expression (c2) by the volume Vu. In other words, the upper layer portion concentration Dau(n) is a value obtained by weighting and averaging the preceding value Dau(n−1) of the upper layer portion concentration and the cell concentration Cdaj(n). More specifically, the preceding value Dau(n−1) of the upper layer portion concentration is weighted by "Vu−FQu(n)," which is obtained by subtracting the tipper layer portion inflow amount FQu(n) from the volume Vu of the upper layer portion DPU. The cell concentration Cdaj(n) is weighted by the upper layer portion inflow amount FQu(n).

The CPU 42 calculates the average value Dave(n) of the alcohol concentration in the delivery pipe 30 by calculating the average value of the alcohol concentration of the fuel in each of the upper layer portion DPU and the lower layer portion DPD (S24). That is, the CPU 42 calculates the average value Dave(n) with the following expression (c3).

$$\{Vu \cdot Dau(n) + Vd \cdot Dad(n)\}/(Vu+Vd) \quad \text{(c3)}$$

The volume Vu of the upper layer portion DPU may be equal to the volume Vd of the lower layer portion DPD. In this case, a weighted moving average value expressed by the above expression (c3) is ½ of the sum of the upper layer portion concentration Dau(n) and the lower layer portion concentration Dad(n). The estimation process of the alcohol concentration in the processes of S14 to S24 takes into consideration the diffusion of fuel in the delivery pipe 30 because the cross-sectional area of the flow path in the delivery pipe 30 is greater than the cross-sectional area of the flow path in the fuel passage 32.

When the process of S24 is completed, the CPU 42 temporarily ends the series of processes shown in FIG. 4.

The operation and advantages of the present embodiment will be described.

The CPU 42 calculates the upper layer portion concentration Dau and the lower layer portion concentration Dad based on the alcohol concentration Da detected by the alcohol concentration sensor 50. The CPU 42 calculates the concentration correction coefficient Ka based on the lower layer portion concentration Dad and calculates the requested injection amount Qd based on the concentration correction coefficient Ka. This allows the CPU 42 to calculate the requested injection amount Qd to be a greater value when the lower layer portion concentration Dad is high than when the lower layer portion concentration Dad is low. Additionally, the CPU 42 variably sets the ignition timing based on the lower layer portion concentration Dad. When the lower layer portion concentration Dad is estimated based on the alcohol concentration Da, open loop correction is performed on the requested injection amount Qd and the ignition timing. Thus, the requested injection amount Qd and the ignition timing are promptly set to appropriate values.

The present embodiment further has the following advantages.

(1) The CPU 42 constantly estimates the lower layer portion concentration Dad through the processes shown in FIG. 4 independently from detection of whether fuel is added to the fuel tank 34. The CPU 42 operates the fuel injection valve 16 and the ignition device 18 based on the estimated lower layer portion concentration Dad. Even when fuel is not added to the fuel tank 34, the alcohol concentration of fuel flowing into the delivery pipe 30 from the fuel passage 32 may change, for example, due to the fuel having a high alcohol concentration in the fuel tank 34 being concentrated on the lower part of the fuel tank 34. Even in such a case, the alcohol concentration of fuel injected from the fuel injection valve 16 is obtained with high accuracy.

Correspondence Relationship

Correspondence relationship between the matters in the embodiment described above and the matters described in the section "Summary" is as follows. The correspondence relationship is shown for each number of the aspects described in the section "Summary."

[1, 2, 4, 5, 6] The physical quantity correlated with the density of the fuel corresponds to the alcohol concentration. The sensor corresponds to the alcohol concentration sensor 50. The estimation process corresponds to the processes of S20 and S22. The density parameter corresponds to the alcohol concentration. The operation unit corresponds to the fuel injection valve 16 and the ignition device 18. The operation process corresponds to the injection valve operation process M16 and the ignition operation process M18.

The flowing amount calculation process corresponds to the process of S10. The division process corresponds to the processes of S14 to S18. The upper layer portion update process corresponds to the process of S22. The lower layer portion update process corresponds to the process of S20.

Other Embodiments

The present embodiment can be modified and implemented as below. The present embodiment and the following modified examples can be implemented by being combined with each other within a scope not technically conflicting each other.

Operation Process

In the embodiment described above, the fuel injection valve 16 and the ignition device 18 are operated using the estimated alcohol concentration (lower layer portion concentration Dad) regardless of whether fuel is added to fuel tank 34. However, there is no limit to such a configuration. For example, after a predetermined period of time elapses from the time the fuel is added to fuel tank 34, the concentration correction coefficient Ka may be calculated using the alcohol concentration Da detected by the alcohol concentration sensor 50. That is, the fuel injection valve 16 and the ignition device 18 may be operated based on the alcohol concentration Da. The predetermined period of time may be set to a period of time assumed to be taken the alcohol concentration of the fuel in the deliver pipe 30 to converge on a value after the addition of fuel. Whether the fuel has been added to the fuel tank 34 may be determined based on, for example, the change amount of the alcohol concentration Da being greater than or equal to a predetermined amount or may be determined based on a detection of an increase in the amount of fuel in the fuel tank 34.

In the embodiment described above, the increase correction is performed on the fuel injection amount and the ignition timing is variably set based on an estimated value of the alcohol concentration of the fuel injected from the fuel injection valve 16. However, there is no limit to such a configuration. For example, only one of the increase correction process of the fuel injection amount or the variably setting process of the ignition timing may be executed.

Connection Area between Delivery Pipe 30 and Fuel Passage 32

In the embodiment described above, the fuel passage 32 is connected to the central portion of the delivery pipe 30 between the upper side and the lower side in the vertical direction when the posture of the vehicle is horizontal. However, there is no limit to such a configuration. That is, the connection area between the delivery pipe 30 and the fuel passage 32 can be appropriately changed.

Supply Area

In the embodiment described above, the supply area is located in the delivery pipe 30 at the lower side in the vertical direction when the posture of the vehicle is horizontal. However, the position of the supply area in the delivery pipe 30 can be appropriately changed. For example, the supply area may be located at the upper side in the delivery pipe 30. Furthermore, for example, when the supply area is included in both the upper layer portion DPD and the lower layer portion DPD, the supply area may be biased toward one of the upper layer portion DPU or the lower layer portion DPD. However, in that case, the density parameter acquired by the operation unit may also be changed as described in the following section "Density Parameter Acquired by Operation Unit." The estimation process may be changed as described in the following section "Estimation Process."

Density Parameter Acquired by Operation Unit

For example, as described in the section "Supply Area," when the supply area is located at the upper side of the delivery pipe 30 in the vertical direction with the vehicle horizontally located and the fuel is supplied to fuel injection valve 16 from the relevant supply area, the operation unit may be operated based on the upper layer portion concentration Dau. Additionally, for example, as described in the section "Supply Area," when the supply area is included in both the upper layer portion DPU and the lower layer portion DPD and is biased toward one of the upper layer portion DPD or the lower layer portion DPD, the operation unit may be operated using a weighted moving average value of the upper layer portion concentration Data and the lower layer portion concentration Dad. More specifically, for example, when the supply area is included in both the upper layer portion DPU and the lower layer portion DPD and is biased toward the lower layer portion DPD, the operation unit may be operated by assuming that the alcohol concentration of the fuel to be injected is "$\alpha \cdot Dad + (1-\alpha) \cdot Dau$" where a weighting coefficient $\alpha$ is greater than ½ and less than one.

Density Parameter of Fuel Flowing into Delivery Pipe

The embodiment described above is based on an assumption that the fuel in the fuel passage 32 having the alcohol concentration detected by the alcohol concentration sensor 50 flows into the delivery pipe 30 without being mixed with fuel having a different alcohol concentration in the other cells C2, C3, . . . the fuel passage 32. However there is limit to such a configuration.

Further, when the internal combustion engine 10 includes multiple delivery pipes, the alcohol concentration of fuel flowing into each delivery pipe may be determined as follows.

Figure 5A:
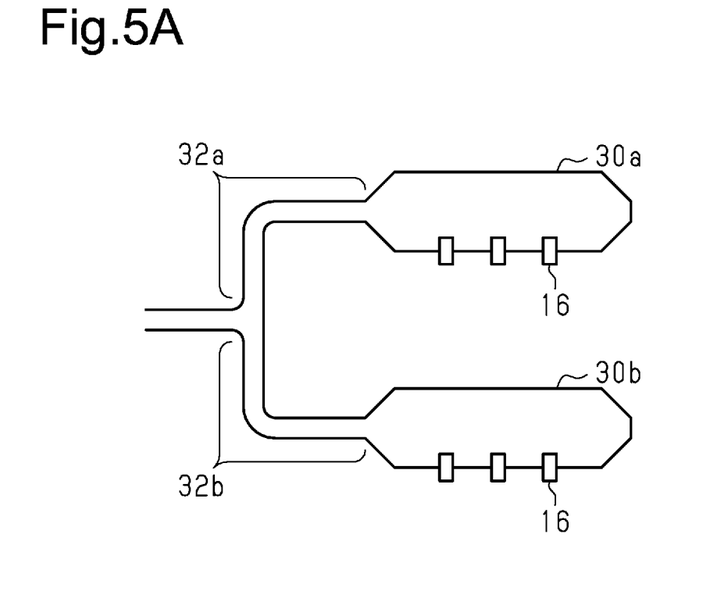
FIG. 5A is a diagram showing a modified example of an internal combustion engine.

FIG. 5A shows an example of a V-type six-cylinder internal combustion engine that includes a first delivery pipe 30a and a second delivery pipe 30b connected in parallel. In this case, the CPU 42 may calculate the alcohol concentration in a portion joining the first fuel passage 32a connected to the first delivery pipe 30a and the second fuel passage 32b connected to the second delivery pipe 30b. More specifically, an integrated value of the flowing amount FQb corresponding to the amount of fuel injected from the fuel injection valve 16 connected to the second delivery pipe 30b and the flowing amount FQa corresponding to the amount of fuel injected from the fuel injection valve 16 connected to the first delivery pipe 30a is calculated. The CPU 42 may assume that the alcohol concentration of the joined portion is equal to the alcohol concentration Da obtained at the point in time when the integrated value is decreased by a value equal to the volume of the fuel passage 32 from the portion where the alcohol concentration sensor 50 is located to the joined portion. Also, the CPU 42 may assume that the alcohol concentration of the fuel flowing into the first delivery pipe 30a is equal to the alcohol concentration of the joined portion at a point in time when the integrated value of the flowing amount FQa is decreased by the volume of the first fuel passage 32a. The CPU 42 may assume that the alcohol concentration of the fuel flowing into the second delivery pipe 30b is equal to the alcohol concentration of the joined portion at a point in time when the integrated value of the flowing amount FQb is decreased by the volume of the second fuel passage 32b.

Figure 5B:
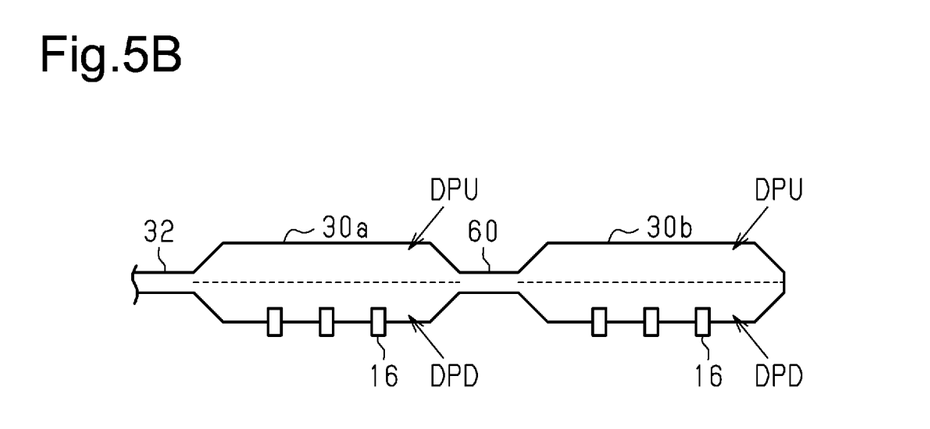
FIG. 5B is a diagram showing another modified example of an internal combustion engine.

FIG. 5B shows an example of a V-type six-cylinder internal combustion engine that includes the first delivery pipe 30a and the second delivery pipe 30b connected in series through the fuel passage 60. In this example, the fuel passage 60 is connected to the first delivery pipe 30a without being biased toward any of the upper layer portion DPU and the lower layer portion DPD of the first delivery pipe 30a. Thus, the alcohol concentration of the fuel discharging from the first delivery pipe 30a into the fuel passage 60 may be calculated by averaging the upper layer portion concentration Dau and the lower layer portion concentration Dad relating to the first delivery pipe 30a. In addition, the fuel passage 60 may be divided into multiple cells, and the alcohol concentration of the fuel flowing into the second delivery pipe 30b may be estimated by assuming that the fuel flowing in from first delivery pipe 30a moves in the fuel passage 60 in accordance with the amount of the fuel discharged from the second delivery pipe 30b to the fuel injection valve 16. In an example, when the fuel passage 60 is connected to the upper layer portion DPU side of the first delivery pipe 30a, the alcohol concentration of the fuel discharging from the first delivery pipe 30a to the fuel passage 60 is considered as the upper layer portion concentration Dau related to the first delivery pipe 30a. In another example, when the fuel passage 60 is connected to both the upper layer portion DPU and the lower layer portion DPD of the first delivery pipe 30a at a position biased toward one of the upper layer portion DPU or the lower layer portion DPD, the alcohol concentration of the fuel discharging to the fuel passage 60 may be calculated by performing a weighted moving average process on the upper layer portion concentration Dau and the lower layer portion concentration Dad related to the first delivery pipe 30a.

Even in the case of the configuration shown in FIG. 5B, the upper layer portion concentration Dau and the lower layer portion concentration Dad of the second delivery pipe 30b can be estimated by the process of S20 and S22. However, with regards to the upper layer portion concentration Dau and the lower layer portion concentration Dad of the first delivery pipe 30a, the processes of S20 and S22 need to be changed as illustrated in the following section "Estimation Process."

Estimation Process

For example, as described in the section "Supply Area," when fuel is supplied to the fuel injection valve 16 from an upper position in the vertical direction when the posture of the vehicle is horizontal, the estimation process may be executed as follows. First, the lower layer portion concentration Dad(n) may be calculated such that a value obtained by multiplying the Vd of the lower layer portion DPD and the lower layer portion concentration Dad(n) equals a value obtained in the above expression (c1) in which "Vd−FQ" is replaced with "Vd−FQd" and the term "FQu(n)·Dau(n−1)" is removed. In other words, the lower layer portion concentration Dad(n) may be calculated such that the value obtained by multiplying the volume Vd of the lower layer portion DPD and the lower layer portion concentration Dad(n) matches the following equation (c4).

$$(Vd-FQd(n)) \cdot Dad(n-1) + FQd(n) \cdot Cdaj(n) \qquad (c4)$$

The upper layer portion concentration Dau(n) may be calculated such that a value obtained by multiplying the volume Vu of the upper layer portion DPU and the upper layer portion concentration Dau(n) equals a value obtained from the above expression (c2) in which "Vu−FQu" is replaced with "Vu−FQ" and "FQd(n)·Dad(n−1)" is added. In other words, the upper layer portion concentration Dau(n) may be calculated such that the value obtained by multiplying the volume Vu of the upper layer portion DPU and the upper layer portion concentration Dau(n) matches the following equation (c5).

$$(Vu-FQ(n)) \cdot Dau(n-1) + FQu(n) \cdot Cdaj(n) + FQd(n) \cdot Dad(n-1) \qquad (c5)$$

Furthermore, for example, as described in the section "Supply Area," when the supply area is included in both the upper layer portion DPU and the lower layer portion DPD and is biased toward one of the upper layer portion DPU or the lower layer portion DPD, the estimation process may be executed as follows. More specifically, for example, when the supply area is biased toward the lower layer portion DPD, the flowing amount of the fuel flowing from the upper layer portion DPU to the fuel injection valve 16 is assumed to be "(1−α)·FQ," and the flowing amount of the fuel flowing from the lower layer portion DPD to the fuel inject on valve 16 is assumed to be "α·FQ" using a weighting coefficient a greater than ½ and less than one. When "(1−α)·FQ−FQu" is a positive value, it is assumed that fuel flows from the lower layer portion DPD to the upper layer portion DPU in a flowing amount of "(1−α)·FQ−FQu." When "α·FQ−FQd" is a positive value, it is assumed that fuel flows from the upper layer portion DPU to the lower layer portion DPD in a flowing amount of "α·FQ−FQd." Then, the processes according to S20 and S22 are executed. For example, with regards to the estimation process in the case of FIG. 5B described in the section "Density Parameter of Fuel Flowing into Delivery Pipe," an example of a case in which the fuel passage 60 is connected to the first delivery pipe 30a without being biased toward any of the upper layer portion DPU or the lower layer portion DPD of first delivery pipe 30a will be described.

The CPU 42 calculates the flowing amount FQb corresponding to the amount of fuel injected from the fuel injection valve 16 connected to the second delivery pipe 30b and the flowing amount FQa corresponding to the amount of fuel injected from the fuel injection valve 16 connected to the first delivery pipe 30a. Then, the CPU 42 assumes that the amount of fuel flowing into the first delivery pipe 30a from the fuel passage 32 is "FQa+FQb" and calculates the upper layer portion inflow amount FQu and the lower layer portion inflow amount FQd. The CPU 42 assumes that the amount of fuel discharging from the lower layer portion DPD of the first delivery pipe 30a is "FQa+(FQb/2)." The CPU 42 assumes that the amount of fuel discharging from the upper layer portion DPU of the first delivery pipe 30a to the fuel passage 60 is "FQb/2." The CPU 42 assumes that the amount of fuel flowing from the upper layer portion DPU to the lower layer portion DPD is "Ru·FQa" and calculates the upper layer portion concentration Dau and the lower layer portion concentration Dad related to the first delivery pipe 30a through processes according to the processes of S20 and S22 in the embodiment described above.

Different Density Fuel

Fuels having different densities are not limited to fuels having different alcohol concentrations. In a case of using fuels that have different densities and differ from each other in amount for reacting with a unit amount of oxygen without excess or deficiency according to the density, it is important to estimate the density parameter with high accuracy to calculate an injection amount for setting the air-fuel ratio to the target air-fuel ratio through open loop control. Furthermore, for example, in a case of using fuels that have different densities and differ from each other in the optimum ignition timing, such as when combustion speeds differ in accordance with different densities, it is important to estimate the density parameter with high accuracy to calculate an operation amount of the ignition timing used in the open loop control.

Internal Combustion Engine

In the embodiment described above, the fuel injection valve is an in-cylinder injection valve that directly injects fuel into the combustion chamber 14. However, there is no limit to such a configuration. The fuel injection valve may be, for example, a port injection valve that injects fuel into the intake passage 12. Furthermore, the internal combustion engine 10 may include both a port injection valve and an in-cylinder injection valve. When the internal combustion engine 10 includes both the port injection valve and the in-cylinder injection valve, if the alcohol concentration of the fuel injected from the port injection valve and the alcohol concentration of the fuel injected from the in-cylinder injection valve are obtained by a single alcohol concentration sensor 50 the area detected by the alcohol concentration sensor 50 needs to be close to the fuel tank 34 as exemplified in the present embodiment. When the detection target area of the alcohol concentration sensor 50 cannot he located in, for example, the lower layer portion DPD, the estimation process described above is particularly effective. Further, when the internal combustion engine 10 includes an alcohol concentration sensor for the in-cylinder injection valve and an alcohol concentration sensor for the port injection valve, the above estimation process may be effective. More specifically, the estimation process is effective when it is difficult to install the alcohol concentration sensor in a side of the delivery pipe, that is, the upper side or the lower side in the vertical direction when the posture of the vehicle is horizontal, located toward the supply area of the fuel to the fuel injection valve.

Controller

The controller is not limited to one including the CPU 42 and the ROM 44 and executing so ware processes. For example, a dedicated hardware circuit (e.g., ASIC) that executes at least some of the software processes executed in the above embodiment may he provided. In other words, the controller may have any of the following configurations (a) to (c). Configuration (a) includes a processor that executes all the above processes in accordance with programs and a program storage device such as a ROM that stores the programs. Configuration (b) includes a processor and a program storage device that execute some of the above processes according to programs and a dedicated hardware circuit that executes the remaining processes. Configuration (c) includes a dedicated hardware circuit that executes all the above processes. Multiple software circuits including a processor and a program storage device may be used. Multiple dedicated hardware circuits may be used. That is, the above processes may be executed by processing circuitry that includes at least one of one or more software circuits or one or more dedicated hardware circuits. The program storage device, that is, a computer readable medium, includes any available medium that can be accessed by a general purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine being mounted on a vehicle and including a fuel injection valve configured to inject fuel so that the fuel is supplied to a combustion chamber of the internal combustion engine, a delivery pipe configured to supply fuel to the fuel injection valve, and a sensor provided at an upstream side of the delivery pipe and configured to detect a physical quantity correlated with a density of the fuel, wherein the delivery pipe includes a supply area and is configured to supply the fuel from the supply area to the fuel injection valve, when a posture of the vehicle is horizontal, the supply area is located at a position biased toward one of an upper side or a lower side of the delivery pipe in a vertical direction, and the controller comprising processing circuitry, wherein
the processing circuitry is configured to execute
an estimation process that estimates a density parameter of fuel in an upper layer portion of the delivery pipe and a density parameter of fuel in a lower layer portion of the delivery pipe in the vertical direction based on a detection value of the sensor, and
an operation process that includes acquiring a density parameter of the fuel injected from the fuel injection valve based on at least one of the estimated density parameter of the fuel in the upper layer portion or the estimated density parameter of the fuel in the lower layer portion and operating an operation unit of the internal combustion engine based on the acquired density parameter,
the density parameter of one of the upper layer portion or the lower layer portion located closer to the supply area has a higher degree of contribution to the density parameter of the fuel injected from the fuel injection valve, and
the estimation process includes a process that assumes that when the density of the fuel flowing into the delivery pipe is high, a greater proportion of the fuel flowing into the delivery pipe flows into the lower layer portion than when the density of the fuel flowing into the delivery pipe is low.

2. The controller according to claim 1, wherein
the supply area is located in the lower layer portion, and
the operation process includes a process that operates the operation unit based on the density parameter of the fuel in the lower layer portion.

3. The controller according to claim 2, wherein the estimation process includes
a flowing amount calculation process that calculates a flowing amount of fuel flowing into the delivery pipe based on a fuel injection amount of the fuel injection valve,
a division process that calculates a flowing amount of fuel flowing into the lower layer portion and a flowing amount of fuel flowing into the upper layer portion from the flowing amount calculated by the flowing amount calculation process based on the detection value of the sensor,
an upper layer portion update process that updates the density parameter of the fuel in the upper layer portion based on an average value of a preceding value of the density parameter of the fuel in file upper layer portion and a density parameter of the fuel flowing into the delivery pipe, wherein the upper layer portion update process assigns the preceding value of the density parameter of the fuel in the upper layer portion to a value obtained by subtracting the flowing amount of the fuel flowing into the upper layer portion from a volume of the upper layer portion and assigns the density parameter of the fuel flowing into the delivery pipe to the flowing amount of the fuel flowing into the upper layer portion, and
a lower layer portion update process that updates the density parameter of the fuel in the lower layer portion based on an average value of a preceding value of the density parameter of the fuel in the lower layer portion, the preceding value of the density parameter of the fuel in the upper layer portion, and the density parameter of the fuel flowing into the delivery pipe, wherein the lower layer portion update process assigns the preceding value of the density parameter of the fuel in the lower layer portion to a value obtained by subtracting the flowing amount calculated by the flowing amount calculation process from a volume of the lower layer portion, assigns the preceding value of the density parameter of the fuel in the upper layer portion to the flowing amount of the fuel flowing into the upper layer portion, and assigns the density parameter of the fuel flowing into the delivery pipe to the flowing amount of the fuel flowing into the lower layer portion.

4. The controller according to claim 1, wherein
the processing circuitry is configured to constantly execute the estimation process regardless of whether fuel is added to a fuel tank configured to store the fuel to be supplied to the delivery pipe, and
the operation process includes a process that operates the operation unit based on at least one of the estimated density parameter of the fuel in the upper layer portion or the estimated density parameter of the fuel in the lower layer portion regardless of whether the fuel is added to the fuel tank.

5. The controller according to claim 1, wherein
the sensor is an alcohol concentration sensor configured to detect alcohol concentration, and
the density parameter is alcohol concentration.

6. A method for controlling an internal combustion engine, the internal combustion engine being mounted on a vehicle and including a fuel injection valve configured to inject fuel so that the fuel is supplied to a combustion chamber of the internal combustion engine, a delivery pipe configured to supply fuel to the fuel injection valve, and a sensor provided at an upstream side of the delivery pipe and configured to detect a physical quantity correlated with a density of the fuel, wherein
the delivery pipe includes a supply area and is configured to supply the fuel from the supply area to the fuel injection valve, and
when a posture of the vehicle is horizontal, the supply area is located at a position biased toward one of an upper side or a lower side of the delivery pipe in a vertical direction,
the method comprising:
executing an estimation process that estimates a density parameter of fuel in an upper layer portion of the delivery pipe and a density parameter of fuel in a lower layer portion of the delivery pipe in the vertical direction based on a detection value of the sensor; and
executing an operation process that includes acquiring a density parameter of the fuel injected from the fuel injection valve based on at least one of the estimated density parameter of the fuel in the upper layer portion or the estimated density parameter of the fuel in the lower layer portion and operating an operation unit of the internal combustion engine based on the acquired density parameter,
the density parameter of one of the upper layer portion or the lower layer portion located closer to the supply area has a higher degree of contribution to the density parameter of the fuel injected from the fuel injection valve, and
the estimation process includes a process that assumes that when the density of the fuel flowing into the delivery pipe is high, a greater proportion of the fuel flowing into the delivery pipe flows into the lower layer portion than when the density of the fuel flowing into the delivery pipe is low.

* * * * *